United States Patent [19]
Gulistan

[11] 3,745,708
[45] July 17, 1973

[54] FASTENER FOR PRODUCING RELATIVE MOVEMENT OF PARTS

[75] Inventor: Bulent Gulistan, Malibu, Calif.

[73] Assignee: Deutsch Fastener Corp., Los Angeles, Calif.

[22] Filed: Aug. 26, 1971

[21] Appl. No.: 175,055

[52] U.S. Cl. .................................. 49/454, 74/424.8
[51] Int. Cl. ............................................ E05d 13/00
[58] Field of Search .............. 49/417, 452, 454–457, 49/418; 16/220; 85/1 K; 151/69, 41.74; 74/424.8

[56] References Cited
UNITED STATES PATENTS

| | | | |
|---|---|---|---|
| 2,774,996 | 12/1956 | Teggelaar | 49/418 |
| 2,546,735 | 3/1951 | Foote | 49/418 |
| 2,359,552 | 10/1944 | Francia | 49/418 |

*Primary Examiner*—Kenneth Downey
*Attorney*—Richard F. Carr et al.

[57] ABSTRACT

An arrangement for producing relative movement between two parts comprising a fastener having a barrel, at one end of which is an abutment and a thin-walled portion to extend through an opening in a movable member and bent outwardly to form a flange to cooperate with the abutment to secure the barrel to the movable member, a screw extending through a threaded opening in the opposite end of the barrel, the screw at its outer end having an extension of smaller diameter providing a radial shoulder and a relatively thin wall so that the extension can pass through an opening in an attaching member, with the thin wall being bent outwardly to form a flange to cooperate with the shoulder of the screw to hold the screw rotatably to the attaching member, the attaching member, in turn, having a shoulder and a tubular section with a thin wall, whereby the tubular section can fit through an opening in a stationary member with the abutment of the attaching member at one end of the opening and the thin wall of the attaching member being bent outwardly to form a flange to cooperate with the abutment of the attaching member in holding the attaching member to the stationary member.

14 Claims, 5 Drawing Figures

INVENTOR.
BULENT GULISTAN
BY
ATTORNEYS.

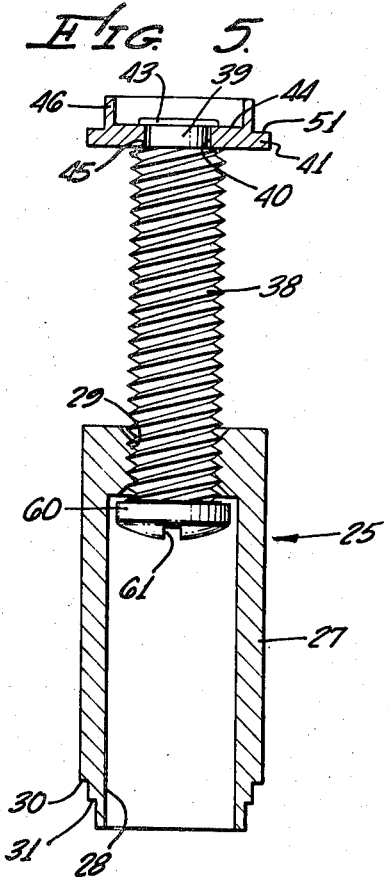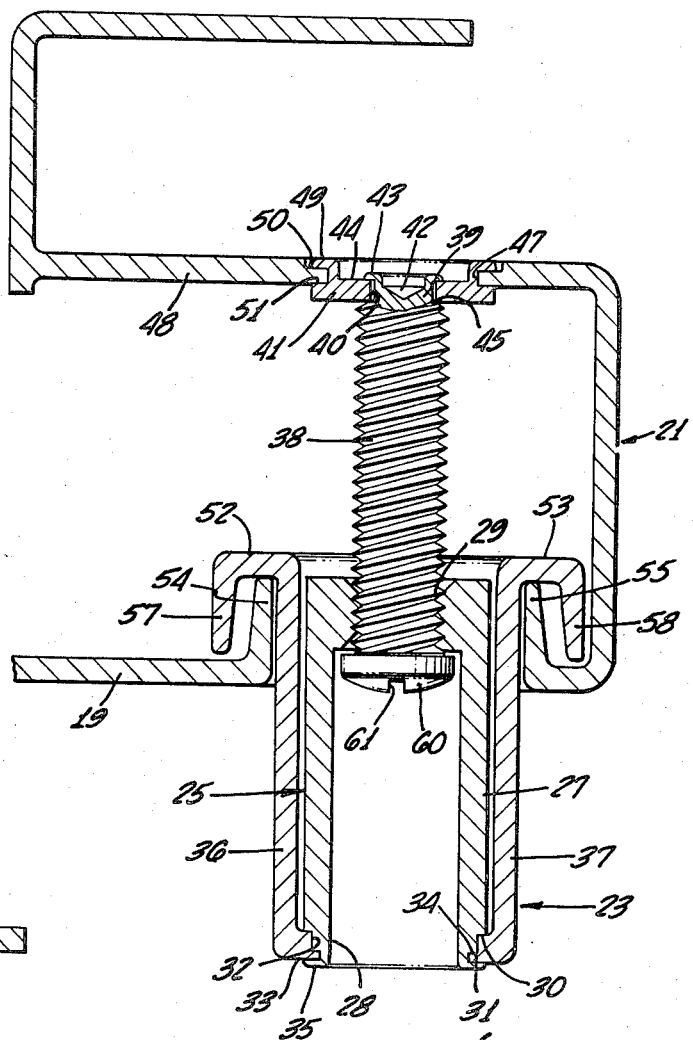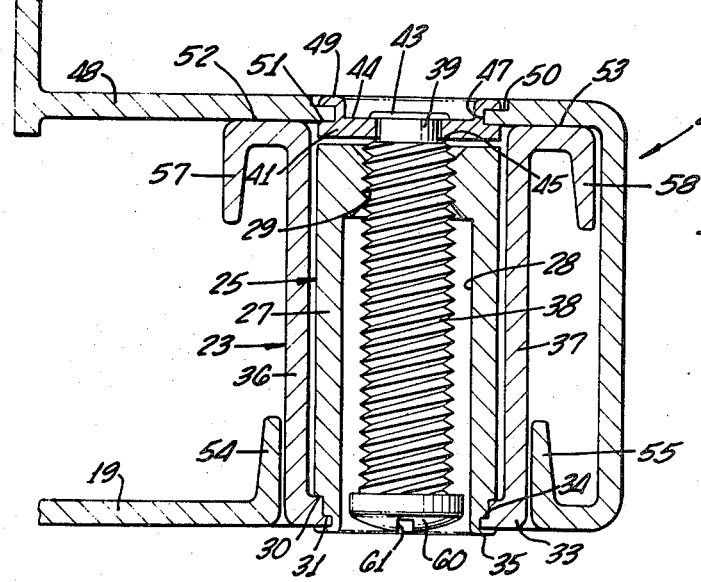

FASTENER FOR PRODUCING RELATIVE MOVEMENT OF PARTS

BACKGROUND OF THE INVENTION

1. Field of the Invention

This invention relates to a fastening arrangement to provide relative movement between two parts.

2. Description of Prior Art

The present invention is particularly useful in securing together two elements that are to have a continuous attachment, but which must be movable relative to each other. It can be employed in the mounting of sliding doors and windows, securing them in a way so that they can be readily removable. In conventional designs, the frame of a glass door or window is held in a suitable track at the top and bottom, which guide it in its sliding movement. In the past, there has been no satisfactory means for rapidly attaching and permitting removal of the sliding glass doors or windows. Installations become semipermanent, and it is a time-consuming operation to remove the track arrangement to permit release of the sliding element.

SUMMARY OF THE INVENTION

The present invention not only allows rapid installation and removal of a sliding glass door or window, but also is simple to operate, requiring virtually no skill. The arrangement is low in cost and uncomplicated. At the same time, the operative elements are fully recessed and virtually undetectable so that the installation preserves a neat and attractive appearance.

The device includes a fastener which is made up of a tubular barrel having a cylindrical bore extending inwardly a substantial distance at one end, while a smaller threaded bore extends through the opposite end. A screw is received in the threaded bore and projects outwardly from the opposite end of the barrel. The outer end of the screw is reduced in diameter to provide a radial shoulder and a short extension that fits through an opening in a disk portion of an attaching member. A flange is bent outwardly at the distal end of the extension of the screw to cooperate with the shoulder in providing abutments for securing the screw to the disk. The attachment is loose enough to allow rotation of the screw relative to the disk. The disk has a short tubular extension projecting around and outwardly of the flange of the screw extension.

The disk is attached to the stationary frame element of the door assembly. This is accomplished rapidly and easily by extending the tubular portion of the attaching member through an opening in the frame element and bending the outer portion of the tubular part outwardly to form a flange. This flange and a shoulder at the periphery of the disk provide opposed abutments that hold the disk to the frame member.

The barrel is secured to the beam that ordinarily is positioned adjacent the frame of the sliding door to prevent it from moving laterally. The barrel fits through an opening in the beam, the barrel having an abutment which engages the opening on one side. The barrel beyond the abutment is of relatively thin circumferential wall, which is bent outwardly to form a flange to form a second abutment cooperating with the first to secure the barrel to the beam. Again, the attachment is made quickly and without difficulty.

Rotation of the screw will produce a reaction on the barrel which causes it to move axially relative to the stationary frame element. This, in turn, causes the beam with which the barrel is associated to move between a position adjacent the frame of the door and a retracted position remote from the frame of the door, which allows removal of the door. Of course, ordinarily more than one fastener element is required for any installation.

BRIEF DESCRIPTION OF THE DRAWINGS

FIG. 3 is a further enlarged transverse sectional view illustrating the beam in its extended position;

FIG. 4 is a view similar to FIG. 3, but with the beam in its retracted position; and FIG. 5 is a longitudinal sectional view of the fastener used for raising and lowering the beam.

Figure 1:
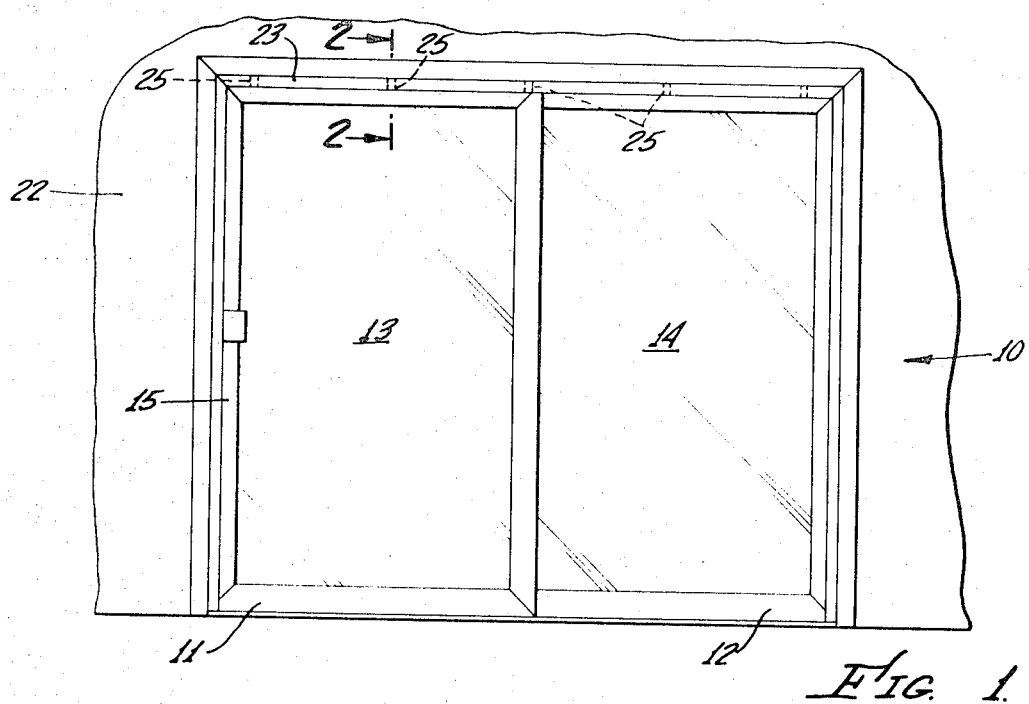
FIG. 1 is a side elevational view of a sliding door assembly incorporating the present invention.

DESCRIPTION OF THE PREFERRED EMBODIMENT:

In FIG. 1 is illustrated a door assembly 10, which includes a slidable unit 11 and a stationary portion 12. Glass panels 13 and 14 are carried by the frames of the units 11 and 12. As seen in the enlarged illustration of FIG. 2, the frame 15 for the sliding door 11 is in the form of a channel with depending flanges 16 and 17 which, through a gasket 18, hold the glass panel 13. The frame 15 is positioned at its upper end within an elongated slot bounded at the upper and left-hand portions by surfaces 19 and 20, respectively, of a metal frame unit 21, which is secured to the wall 22. A channel beam 23 is positioned on the opposite side of the frame 15 to form the other surface of the slot parallel to the vertical frame surface 20. This retains the upper portion of the frame 15, yet the door 11 is slidable and guided in a fixed path so that it can be opened and closed. The beam 23 is movable upwardly so that it will clear the upper edge of the frame 15 when it is desired to remove the unit 11. This is accomplished by fasteners 25, one of which is shown in enlarged scale in FIGS. 3, 4 and 5.

The fastener 25 includes an elongated barrel 27, which has a central cylindrical opening 28 extending for the major portion of its length. The inner end of the opening 28 connects to a smaller threaded opening 29 that extends through the end of the barrel. The exterior of the barrel at the end adjacent the entrance to the opening 28 is stepped to provide two annular shoulders 30 and 31. This part of the barrel fits in an opening 32 in the lower horizontal wall 33 of the beam 23. The shoulder 30 engages the upper surface of the wall 33 of the beam 23, while the shoulder 31 contacts a corresponding shoulder 34 intermediate the ends of the opening 32 in the wall. The stepped end of the barrel reduces its outside diameter and results in a thin circumferential wall beyond the shoulder 31. This part of the barrel 27 is bent outwardly over the lower surface of the wall 33 of the beam 23, forming a flange 35 which cooperates with the shoulders 30 and 31 in securing the barrel 27 to the beam 23. This positions almost the entire length of the barrel 27 above the bottom wall 33 of the beam and between its parallel sidewalls 36 and 37.

The threaded shank of a screw 38 received in the threaded opening 29 in the barrel 27. Preferably, the threads of the screw 38 and the opening 29 have a quadruple lead for imparting extensive axial travel when the screw is rotated. The upper end 39 of the screw 38, which is unthreaded and of reduced diameter, is received within an opening 40 in a disk 41. An axial opening 42 extends into the upper end 39 of the screw 38, resulting in a thin wall for the outer part of the screw end 39. This wall is bent outwardly to form a flange 43 that overlaps the upper surface 44 of the transverse wall of the disk 41. The flange 43 cooperates with the radial shoulder 45, where the diameter of the screw is reduced at the end portion 39, in holding the screw to the disk 41. Enough clearance is left between the flange 43 and the shoulder 45 to assure that the disk 41 is not gripped and the screw 38 is free to rotate relative to the disk.

A tubular section 46 extends upwardly from the disk 41 and through an opening 47 in a horizontal wall 48 of the frame 21. The tubular section 46 has a thin wall enabling it to be bent outwardly to provide a flange 49 in a counterbore 50 at the upper end of the opening 47. The flange 49, together with a peripheral shoulder 51 around the disk 41 at the base of the tubular section 46, attaches the disk 41 to the frame portion 48.

Figure 2:
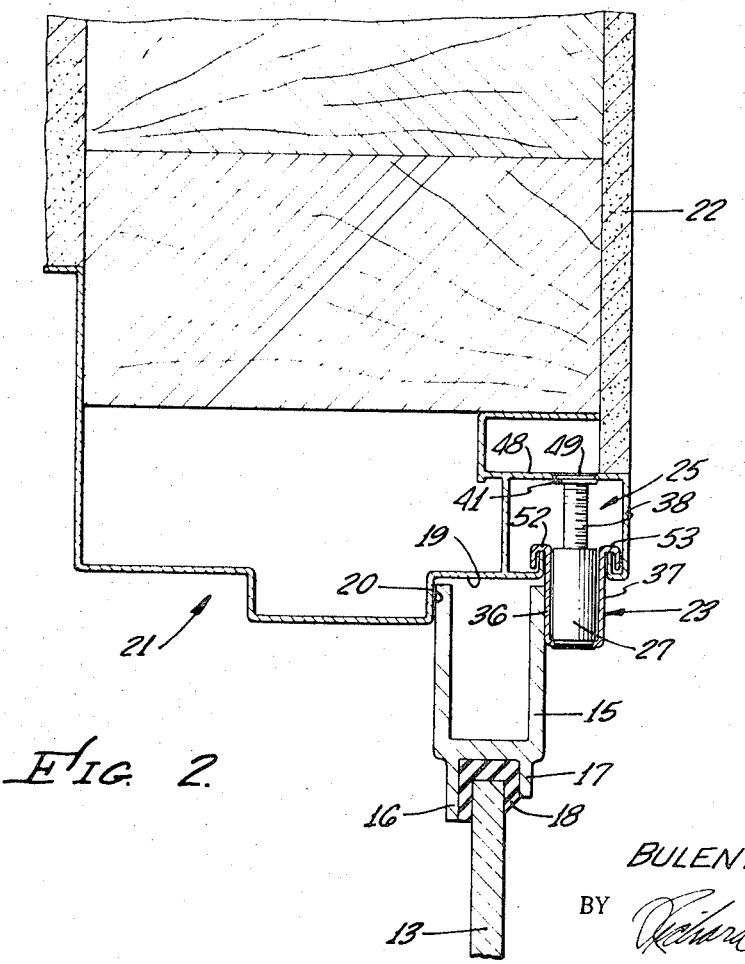
FIG. 2 is an enlarged transverse sectional view taken along line 2—2 of FIG. 1.

When the beam 23 is in the extended position of FIGS. 2 and 3, laterally projecting flanges 52 and 53 at the upper ends of the sidewalls 36 and 37 of the beam 23 overlap upstanding parallel flanges 54 and 55 which define the edges of a slot in the frame 21 that receives the beam 23. The flanges 52 and 53 of the beam engage the flanges 54 and 55 of the frame, respectively, which act as stops to limit the movement of the beam 23 to its extended position. Additional depending guide flanges 57 and 58 are at the outer ends of the lateral flanges 52 and 53 of the beam 23 and fit outside the frame flanges 54 and 55 when the beam 23 is extended. When the beam 23 is raised as in FIG. 4, the upper surfaces of the flanges 52 and 53 are brought into engagement with the undersurface of the frame wall 48 to limit the upward travel of the beam.

Retraction of the beam 23 is effected by rotation of the screw 38. This is easily accomplished by inserting a screwdriver into the open 28 in the barrel 27 to engage the head 60 of the screw 38 at its driving slot 61. When the screw is turned, it is prevented from axial movement because of its attachment to the fixed disk 41. Only the screw 38 turns because it is rotatable relative to the disk 41, which tightly grips the frame wall 48 and does not rotate. Also, the barrel 25 grips the beam wall 33 so that the barrel does not turn. Consequently, the reaction of the threads of the screw 38 against the barrel 27 will cause the barrel to move upwardly. This, because the barrel 27 is attached to the beam 23 by the flange 35, will raise the beam 23. The beam 23 can be moved all the way up to the position of FIG. 4, with only a small amount of rotation of the screw 38 because of the quadruple lead thread on the screw.

In the raised or retracted position of the beam 23, its flanges 52 and 53 engage the frame portion 48. The lower wall 33 of the beam 23 then is substantially flush with the surface 19 of the frame 21 which is adjacent to the frame 15 of the door unit 11. Consequently, the frame 15 of the unit 11 no longer is retained to the surrounding frame assembly, and the unit 11 can be removed.

Upon reinstallation of the unit 11, reverse rotation of the screw 38 rapidly brings the beam 23 back to its extended position, capturing the frame 15, which then is free for only sliding movement. In both positions of the beam 23, it is secured by the fasteners 25 to the wall 48 of the frame 21.

The foregoing detailed description is to be clearly understood as given by way of illustration and example only, the spirit and scope of this invention being limited solely by the appended claims.

I claim:

1. A fastener device for providing movement of one part relative to another part comprising
    a first member,
        said first member having a shoulder engageable with a first part, and a bendable portion for providing upon the bending thereof a flange in opposed spaced relationship with said shoulder for cooperating with said shoulder in holding said first member to said first part, said first member having screw threads thereon,
    a threaded member engaging said screw threads of said first member and rotatable relative thereto,
        said threaded member projecting away from said first member,
    an attaching member,
        said attaching member having a shoulder engageable with the surface of a second part, and a bendable portion for providing upon the bending thereof a flange in opposed spaced relationship with said shoulder of said attaching member for cooperating with said shoulder of said attaching member in holding said attaching member to said second part,
    and means for rotatably securing said threaded member to said attaching member while precluding substantial axial travel of said threaded member relative to said attaching member,
        whereby when said first member is attached to said first part and said attaching member is held to said second part rotation of said threaded member will produce a reaction causing movement of said first part relative to said second part.

2. A fastener device for providing movement of one part relative to another part comprising
    a first tubular member,
        said first member having a first relatively large bore section extending inwardly from one end and a second relatively small threaded bore section extending inwardly from the opposite end, said first member having an external shoulder and a bendable circumferential wall at said one end,
        whereby said wall can be flared outwardly to cooperate with said shoulder and hold said first member to a workpiece,
    a screw,
        said screw having a driving surface in said first bore section,
        said screw having a threaded shank extending through said second bore section and beyond said opposite end of said first member,
    a second member,
    and means rotatably securing the outer end of said shank to said second member while precluding substantial axial movement of said shank relative to said second member,
        said second member including means for fixedly attaching said second member to an adjoining part.

3. A device as recited in claim 2 in which said means for fixedly attaching said second member to an adjoining part includes
an external shoulder on said second member, and an annular thin-walled portion extending beyond said shoulder,
said thin-walled portion being adapted to be bent outwardly for forming a flange for cooperating with said external shoulder of said second member in holding said second member to a second workpiece.

4. A device as recited in claim 3 in which said means for attaching said outer end of said shank to said second member includes
an extension of relatively small external diameter extending outwardly from the end of said shank so as to provide an external shoulder on said shank adjacent said extension,
said second member including a transverse wall having an opening therethrough,
said extension being received in said opening so as to position said external shoulder of said shank adjacent one surface of said transverse wall,
and an integral flange on said extension projecting outwardly over the opposite surface of said transverse wall for cooperating with said external shoulder of said shank in holding said shank to said second member.

5. A device as recited in claim 4 in which said transverse wall is intermediate said annular thin-walled portion.

6. In combination with a first member and a second member which are to be continually secured together, yet intermittently moved between a relatively adjacent position and a relatively remote position, a fastener device comprising
a first tubular element,
said first member having an opening therethrough, said tubular element having an end portion extending through said opening,
said tubular element having an abutment engaging said first member adjacent one end of said opening, and an outwardly bent flange engaging said first member adjacent the other end of said opening,
whereby said abutment and said flange hold said tubular element to said first member,
said tubular element having a threaded portion therein,
a screw received in said threaded portion and extending outwardly from said tubular element away from the opposite end thereof,
said screw having a driving surface within said tubular element, and
a second element,
said second member having an opening receiving said second element,
said second element having an abutment engaging said second member adjacent one end of said opening, and an outwardly bent flange adjacent the opposite end of said opening,
whereby said abutment and said outwardly bent flange of said second element hold said second element to said second member,
said second element having an opening therethrough, said screw having an abutment at the distal end of the shank thereof, and an extension beyond said abutment,
said extension rotatably extending through said opening in said second element,
said abutment of said screw being positioned adjacent and engageable with said second element adjacent one end of said opening in said second element,
said extension having an outwardly bent flange at the opposite end of said opening in said second element engageable with said second element adjacent said opposite end,
whereby said screw is rotatably retained by said second element and rotation of said screw by means of said tubular element will cause relative movement of said first and second members.

7. In combination with a slidable member, an arrangement for removably retaining and guiding said slidable member comprising
a fixed frame means,
said frame means including a longitudinally directed surface,
a beam in spaced parallelism with said longitudinally directed surface,
said beam being movable between an extended position in which said beam is opposite said longitudinally directed surface for retaining and guiding the margin of said slidable member, and a retracted position in which said beam is moved away from said longitudinally directed surface for allowing said margin of said slidable member to be removed,
and means for effecting said movement of said beam,
said last mentioned means including
a tubular member,
means for attaching said tubular member to said beam,
a threaded member,
said tubular member having a threaded opening receiving said threaded member,
an attaching member,
means for connecting said threaded member to said attaching member for permitting rotation of said threaded member relative to said attaching member while preventing substantial axial movement of said threaded member relative to said attaching member, and means for securing said attaching member to said frame means,
whereby rotation of said threaded member produces a reaction through said tubular member for moving said beam.

8. A device as recited in claim 7 including in addition interengageable stop means on said frame means and said beam for limiting the movement of said beam in said extended position thereof.

9. A device as recited in claim 7 in which said means for attaching said tubular member to said beam includes
an external shoulder on said tubular member,
said beam having a wall having an opening therethrough,
said shoulder engaging said wall adjacent one end of said opening,
said tubular member having an end portion extending through said opening, and a flange on said end portion overlapping said wall adjacent the opposite end of said opening for cooperating with said shoulder in holding said tubular member to said wall.

10. A device as recited in claim 7 in which
said frame means includes a wall opposite from said tubular member and spaced therefrom,
said wall having an opening therein,
said attaching member including
- a tubular portion extending through said opening,
- a shoulder engaging said wall adjacent one end of said opening,
- and a flange engaging said wall adjacent the opposite end of said opening for thereby providing said means for securing said attaching member to said frame means.

11. A device as recited in claim 7 in which
said attaching member includes a central disk portion having an opening therethrough,
said threaded member having
- a shoulder engageable with said central disk portion adjacent one end of said opening therethrough,
- an extension beyond said shoulder received in said opening,
- and a flange at the outer end of said extension engageable with said disk portion adjacent the opposite end of said opening therethrough for thereby providing said means for connecting said threaded member to said attaching member.

12. A device as recited in claim 7 in which
said beam includes a duality of sidewalls and an intermediate wall interconnecting said sidewalls,
said opening of said beam being in said intermediate wall,
said tubular member extending from said intermediate wall between said sidewalls.

13. A device as recited in claim 12 in which
said frame means includes a duality of opposed surfaces defining an elongated slot,
said beam being received in said slot,
said intermediate wall of said beam being substantially flush with the edges of said opposed surfaces when said beam is in said retracted position.

14. A device as recited in claim 13 in which
said opposed surfaces are flanges,
said beam having a flange projecting outwardly from each of said sidewalls,
said flanges of said beam being in engagement with said flanges of said frame means when said beam is in said extended position for thereby limiting the movement of said beam.

* * * * *